United States Patent [19]

Ford et al.

[11] 4,250,597

[45] Feb. 17, 1981

[54] CORD GUIDE AND SUPPORT THEREFOR

[75] Inventors: James A. Ford; Steven R. Haarer, both of Sherman Township, St. Joseph County, Mich.

[73] Assignee: Kirsch Company, Sturgis, Mich.

[21] Appl. No.: 92,133

[22] Filed: Nov. 7, 1979

Related U.S. Application Data

[63] Continuation of Ser. No. 953,409, Oct. 23, 1978.

[51] Int. Cl.$^3$ .............................................. F16G 11/04

[52] U.S. Cl. ............................. 24/132 R; 160/178 C; 160/370

[58] Field of Search ......... 24/132 R; 160/173, 178 C, 160/370

[56] References Cited

U.S. PATENT DOCUMENTS

| | | | |
|---|---|---|---|
| 3,068,938 | 12/1962 | Hull | 160/176 |
| 3,269,453 | 8/1966 | Vecchiarelli et al. | 160/176 |
| 4,122,884 | 10/1978 | Salzmann | 160/178 R |

*Primary Examiner*—Kenneth Downey

*Attorney, Agent, or Firm*—Blanchard, Flynn, Thiel, Boutell & Tanis

[57] ABSTRACT

Cord guide, such as a pulley, and support therefor, for use with a liftable shade, as a Roman shade or a venetian blind. There is provided a pivotally suspended cord guide support for use with a liftable shade which will suspend the cord guide in a pivotal manner so that the pull cords may be held for operation at a substantial angle with respect to the wall without diminishing their effectiveness in operating the shade. Specifically, the cord guide is supported within a generally conventional clevislike structure which has a specially constructed head end adapted for pivotal support on and by a ceiling or wall attachable bracket. With such pivotal support, the clevis and the cord guide carried thereby, while normally hanging parallel with the wall, can be angled away therefrom to permit greater ease in pulling of the shade cords but without diminishing the accuracy or effectiveness of said cords in the operating of the shade. A lock and guides for the shade cords may also be provided if desired.

17 Claims, 17 Drawing Figures

CORD GUIDE AND SUPPORT THEREFOR

This is a continuation of application Ser. No. 953,409, filed Oct. 23, 1978.

FIELD OF THE INVENTION

The invention relates to cord guide, normally pulley, support means for the cords of a liftable shade, as a Roman shade or a venetian blind, and relates particularly to a type thereof having hanger means and cord guide housing means which are provided with a pivotal joint therebetween. The hanger means includes a ceiling or wall mountable bracket whereby the pulley and cords may normally occupy positions generally parallel with an adjacent wall but may during operation if desired be angled away from the wall without diminishing the ease or effectiveness of their operation.

BACKGROUND OF THE INVENTION

Liftable shades and the cord guide means, usually pulleys, used therewith have been known for a long time and during all of this period there has necessarily been some means present for supporting such pulleys in a predetermined position with respect to the shade. This has usually been a fixed position with respect to the shade and a position wherein the plane of the pulley was parallel to the plane of the window with which the shade was used. Since the normal method of handling the shade cords would involve maintaining them at least substantially in the plane of a given shade pulley, this would mean maintaining such cords at least substantially in a plane parallel to such window. A careful operator of the shade would have no difficulty in so doing but a careless operator of the shade cords might well stand at some distance from the window, or the wall adjacent the window, and would particularly do so if there were furniture adjacent the wall. In so doing, he would angle the cords at what sometimes became a substantial angle with respect to such wall. This often caused a cord feeding toward a pulley to fail to track with respect to such pulley and either go off the pulley entirely or at least jam between the edge of the pulley and the pulley support. This has in the past been met by providing various types of guiding devices in association with the pulley in order that the cord would be fed onto the pulley in proper alignment therewith regardless of the angle at which the majority of the cords were held with respect to the adjacent wall, i.e., with respect to the plane of the pulley. This has worked with a reasonable degree of satisfaction insofar as preventing the shade cord from escaping from the pulley but such guides normally generate a substantial amount of friction and thereby make more difficult the operation of the shade. While it is recognized that this is of no great consequence with small or short shades, in the case of large shades where there is already a substantial load present, the addition of such further frictional load is highly undesirable.

This problem has long been recognized but insofar as I am aware, there has been only one previous attempt made to deal differently with it. This attempt involved hanging the pulley from a horizontal pin, in somewhat of a loop and pintle arrangement, to permit the pulley to pivot around a horizontal axis parallel with the longitudinal extent of the shade. This permitted the pulley to angle away from the wall to follow the shade cords if same were so angled in somewhat the same manner as the blocks (pulleys) often used in various positions, as on the deck, of a sailboat. This has provided a substantially improved operation but because of the use of metal components and the permanence resulting from metal fabrication, it presents certain problems in manufacturing and inventorying which it is the purpose of the present invention to solve.

Accordingly, the objects of the present invention include:

1. To provide a support for a cord guiding means, usually a pulley means, usable in association with a liftable shade, as a Roman shade or a venetian blind wherein said cord guide support is made entirely from plastics material, wherein said cord guide support comprises a hanger section and a cord guide, usually pulley, housing section and wherein the said housing section will pivot with respect to the hanger section around an axis parallel with the longitudinal extent of the shade.

2. To provide a cord guide support, as aforesaid, which can be manufactured as an independent unit or which can by a simple modification be incorporated into a shade as an integral part thereof.

3. To provide a cord guide support, as aforesaid, in which the cord guide housing section and the hanger section comprise independent parts having broad mutually engageable load bearing surfaces rather than a pivot-and-pin relationship.

4. To provide a cord guide support, as aforesaid, in which the housing section has a snap-in relationship to the hanger section but wherein the parts providing the snap-in function are independent of the load bearing areas so that the snap-in relationship is not dependent upon such parts for carrying the cord guide, as pulley, loading.

5. To provide a cord guide support, as aforesaid, in which a single hanger section design may be utilized for a plurality of cord guide support designs in order to simplify the inventorying of such components.

6. To provide a cord guide support, as aforesaid, in which the parts can be assembled by a single motion and do not require the more complicated motions normally associated with hinge and pin arrangements.

Other objects and purposes of the invention will be apparent to persons acquainted with devices of this general type upon reading the following specification and inspection of the accompanying drawings.

DETAILED DESCRIPTION

Figure 1:
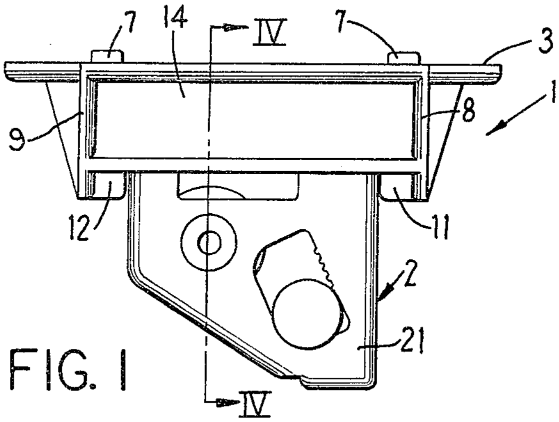
FIG. 1 is a side elevational view of a pulley support embodying the invention and showing same in a position for suspension from a downwardly facing surface, such as a ceiling.

Referring now to the drawings in more detail, there is shown in FIGS. 1–5 a cord guide, here pulley, support assembly comprising a hanger section 1 and a pulley housing 2. The hanger section 1 is arranged for fixing rigidly as by screws to support means, such as the ceiling 5 adjacent the upper end of a liftable shade, and the pulley housing is pivotally connected thereto for swinging motion as indicated by the arrows A and B in FIG. 2.

First examining the hanger section in more detail, there is a body or plate member 3 having a central opening 4 therein for purposes appearing hereinafter. Openings 6 are provided as desired for the entry of screws to fix the pulley hanger to a supporting surface, such as a ceiling. Short projections 7 are provided if desired for firmly holding the hanger rigidly with respect to the supporting surface and preventing its twisting, especially during installation.

Depending from the plate member 3 are trunnion hangers 8 and 9 which carry on their mutually facing surfaces the trunnions 11 and 12, same defining upwardly facing, convex, trunnion surfaces. There are of semicircular cross section and are fixed with respect to, here molded integrally with, the trunnion hangers 8 and 9.

Figure 4:
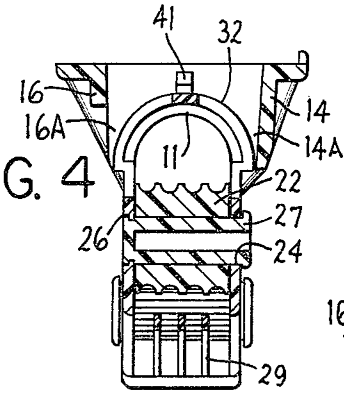
FIG. 4 is a sectional view taken on the line IV—IV of FIG. 1.
Figure 6:
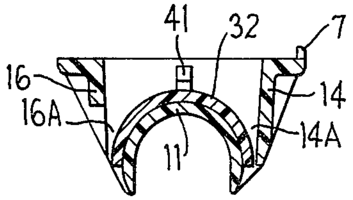
FIG. 6 is a sectional view taken on the line VI—VI of FIG. 5.

Reinforcing members 13 are provided at both ends of the hanger member as desired and provide reinforcing between the plate member 3 and the trunnion hangers 8 and 9. Trunnion guards 14 and 16 extend downwardly from the plate 3, extend between the trunnion hangers 8 and 9 and are spaced at their lowermost extermities sufficient distances 14A and 16A from the trunnions 11 and 12 to provide for the passage therebetween of the pulley housing trunnions as hereinafter described. The trunnion guard 16 may be somewhat shortened as compared to the trunnion guard 14 as shown in FIG. 4 for purposes appearing further hereinafter.

Now turning to the pulley housing 2, same comprises a generally U-shaped body portion or clevis 21 with a pulley 22 rotatably supported therein in any conventional manner such as by the shaft 23 projecting through suitable openings 24 and 26 in the side walls of said clevis. One end of said shaft may be upset as indicated at 27 for holding the pulley firmly in position. An opening 28 is provided in the bottom of the clevis for the passage of the shade cord and cord guides 29 may be provided across said opening 28 if desired. (Said cord guides will not generate appreciable, if any, friction with respect to the shade cords in view of the pivoting of the pulley as hereinafter described in more detail.) Further openings 31 are provided in horizontal alignment with the upper edge of the pulley 22 for the passage of the cords in the region of the pulley outwardly of said pulley housing toward the shade structure.

At the upper side of said clevis 21 at each horizontal end thereof there are provided the pulley trunnions 32 and 33, both having, in this embodiment, downwardly facing concave trunnion surfaces. Same are fixed with respect to, here molded integrally with, the adjacent portions of the clevis 21 and have portions thereof 32A and 33A extending beyond respectively corresponding ends of said clevis for overlapping, engaging with and being supported by, the support trunnions 11 and 12. The curvature of the respectively interengaging trunnions is, of course, substantially concentric to insure smooth operation although if desired the pulley support trunnions 32 and 33 may be designed on a radius slightly longer than that of the support trunnions to insure against binding therebetween.

The length of the pulley housing is such as to fit snugly between the mutually facing ends 11A and 12A of the support trunnions 11 and 12 and the distance between the respectively outer surfaces 36 and 37 of the housing trunnions 32 and 33 is such as to permit said housing trunnions to fit snugly but slidably between the end surfaces 38 and 39 of the opening 4. Thus, the pulley housing can be inserted into operative position merely by passing same through the opening 4 between the trunnions 11 and 12 until the housing trunnions 32 and 33 engage in supporting relationship said hanger trunnions 11 and 12.

If desired, cam-shaped projections 41 and 42 may be provided to provide a snap-in relationship between the hanger 1 and pulley housing 2 for holding same together during the mounting procedure. If said cams 41 and 42 are sloped also on the lower side thereof as shown in the drawings, the parts may be taken apart by a reverse snapping motion to that above described for assembly.

Any desired locking mechanism may be provided for holding the shade cords in a fixed position. In the present embodiment same constitutes a sloped slot 51 with a knurled pin 52 positioned therein. Same will effect more positive operation if there are provided the teeth 53 along one side of said slot into which can fit the teeth 54 comprising the knurling of said pin.

Figure 2:
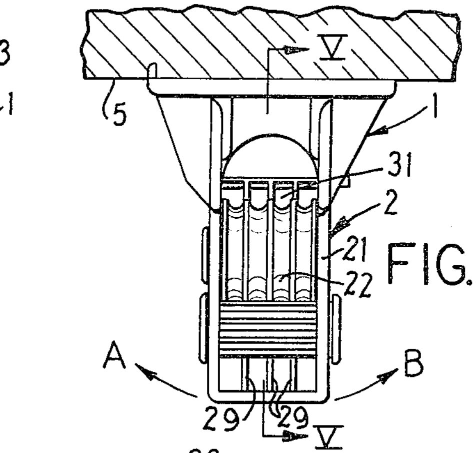
FIG. 2 is an end elevational view taken from the rightward end of FIG. 1 including also a showing of supporting means such as a ceiling and the relationship therewith of said pulley support.
Figure 3:
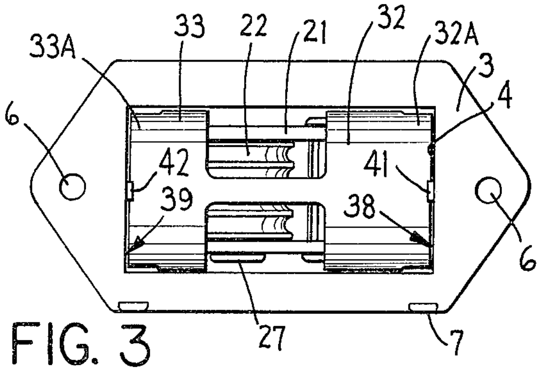
FIG. 3 is a top plan view of the pulley support of FIG. 1.
Figure 5:
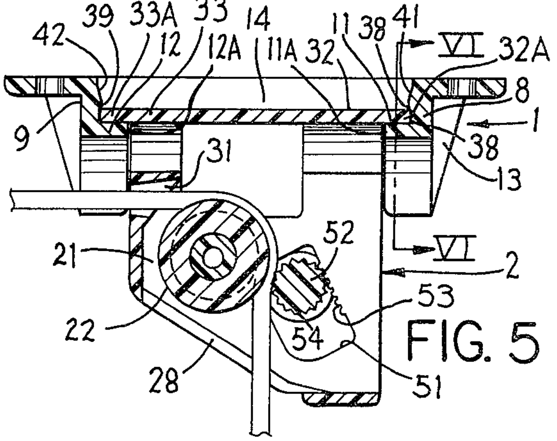
FIG. 5 is a sectional view taken on the line V—V of FIG. 2.
Figure 10:
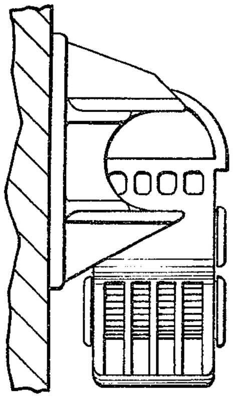
FIG. 10 is an end view of the pulley support similar to FIG. 2 but showing the pulley support in a position of operation appropriate to mounting same on a vertical wall.

In one use of this embodiment said hanger is supported, as shown in FIG. 2, from a ceiling adjacent the upper end of the shade with which same is used. Alternatively, however, with the trunnion guard 16 shortened as shown in the drawings, the clevis may be rotated 90° with respect to the plane of the plate 3 and said plate then fixed, as shown in FIG. 10, to a vertical wall adjacent the window with which the shade is used. In either case, the cords are introduced through the openings between the guards 29 over the pulley 22 and behind the pin 52 as shown in FIG. 5. When said cord is pulled downwardly, the pin 52 will release same and when said cord is permitted to move back upwardly, particularly if it is angled slightly rightwardly as shown in FIG. 5, it will engage said pin in the usual manner and cause same to lock the cord at the desired point against further upward movement. Likewise in either case, whether the plate 3 is positioned vertically or horizontally, the cords may be angled away from the wall adjacent the window with which the shade is being used and said clevis will pivot as needed away from the wall to maintain the plane of the pulley in alignment with the alignment of the cords. This will minimize any friction which would otherwise exist between the cords and the cord guides and still insure that the cords remain in proper operative position on the pulley. In this connection it will be evident that the openings 31 should be arranged as closely as possible to the center or centers around which said trunnions operate in order to insure that pivoting of the clevis with respect to the hanger will not generate undesired friction between said cords and the walls defining said openings 31.

Figure 7:
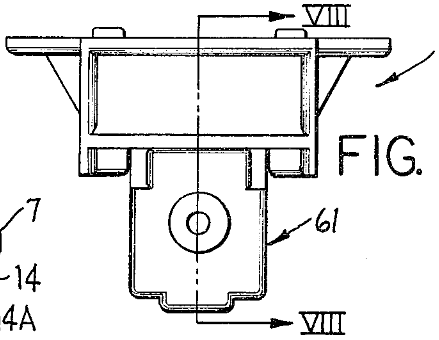
FIG. 7 is a side elevational view of a pulley support assembly utilizing the same hanger member as shown in FIG. 1 but a different pulley support member.
Figure 8:
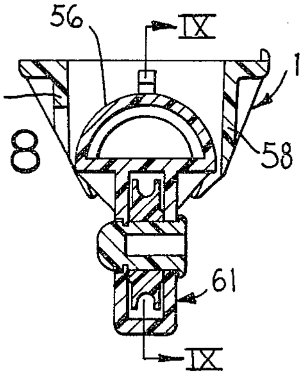
FIG. 8 is a sectional view taken on the line VIII—VIII of FIG. 7.
Figure 9:
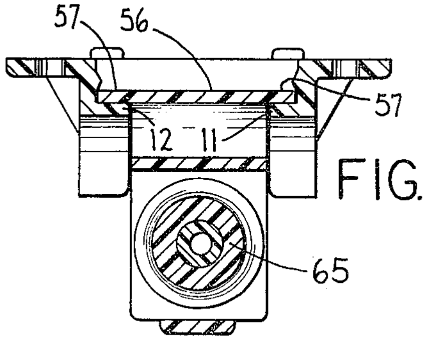
FIG. 9 is a sectional view taken on the line IX—IX of FIG. 8.
Figure 11:
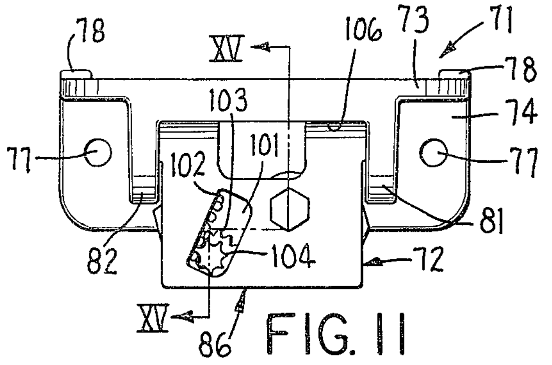
FIG. 11 is a side elevational view of a different embodiment of said pulley support.

FIGS. 7–9 illustrate the same base 1 utilized with a different form of pulley housing, such as that used intermediate the ends of a Roman shade. In this embodiment there is provided a clevis structure 61 for holding a pulley, same being rotatably mounted therein in generally the same manner as above described in connection with said pulley 22. Extending above said clevis is a hemicylindrical portion 56 having extensions 57 extending from each respective end thereof to constitute trunnions. Said trunnions engage the trunnions 11 and 12 of the base 1 in the same manner as above described for the engagement of the trunnions 32A and 33A with the base trunnions 11 and 12.

Trunnion guards 58 and 59 are provided similar to the trunnion guards 14 and 16 and in this case there is provided a cutout 62 if desired to enable the pulley housing to rotate sufficiently to assume a position such that the plane of its pulley is parallel with the plane of the plate 3. This enables this unit also to be wall mounted if desired as well as ceiling mounted in the same general manner as already illustrated with respect to the form of FIGS. 1–5.

This construction may also be snapped in and out of operative position in the same manner as above described for the form of FIGS. 1–5.

It will thus be understood that a single design of base 1 may be utilized with a variety of pulley housings as desired thus simplifying both manufacturing procedure and the inventorying thereof.

Referring now to the form of the invention shown in FIGS. 11–15, it will be seen that in this instance the base structure has a pair of concave upwardly opening trunnion supports which carry a pair of trunnions which in turn support the pulley housing.

Figure 12:
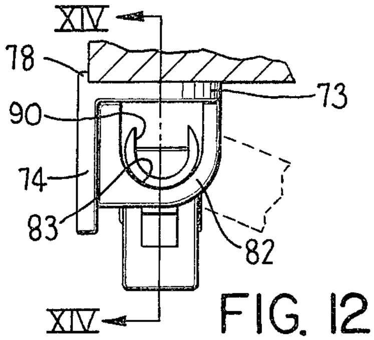
FIG. 12 is an end view of the pulley support of FIG. 11 showing same in relationship with supporting means having a downwardly facing surface and showing in broken lines the capacity of the pulley housing thereof for swinging with respect to the hanger section thereof.
Figure 15:
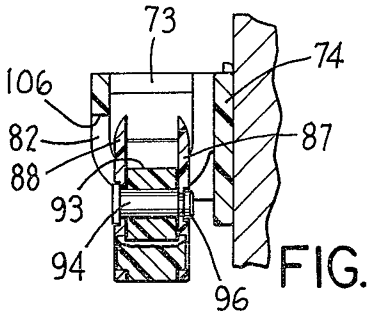
FIG. 15 is a section taken on the line XV—XV of FIG. 11 and showing same mounted upon a vertical supporting surface such as a wall.

Referring to these figures in more detail, the hanger section 71 here comprises a pair of base plates 73 and 74 positioned perpendicularly with respect to each other and fixed rigidly with respect to each other as by being integrally molded as a single unit. Said base plates have means such as openings 76 and 77 associated therewith for reception of screws or other means for fixing same to a downwardly facing surface as shown in FIG. 12 or to a vertical surface as shown in FIG. 15. A plurality, here two, protuberances 78 are provided for guide structure against an edge as shown in FIG. 12 or for reception into a slightly deformable sealing surface for rigidifying said hanger structure 71 with respect thereto.

Figure 13:
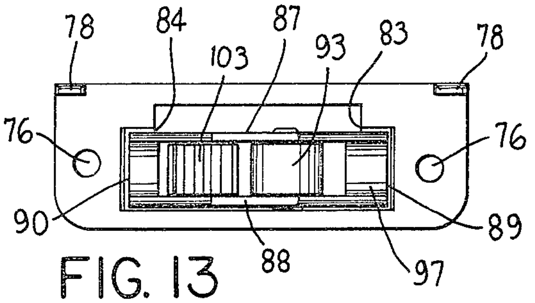
FIG. 13 is a top plan view of the pulley support shown in FIG. 11.

Projecting from and between the base plates 73 and 74 are a pair of spaced trunnion supports 81 and 82, each having coaxial upwardly opening concave surfaces 83 and 84 (FIGS. 12 and 13). Said surfaces are curved on the same radius and are hence in alignment with each other.

Suspended from said hangers 81 and 82 is the cord guide, here pulley, housing 72. Same comprises a generally boxlike structure 86 having sides 87 and 88 parallel with and spaced from each other. Said sides are connected and positioned rigidly with respect to each other by ends 91 and 92 which are rigidly fixed, as by being molded integrally with, said sides 87 and 88. Said box structure 86 also includes a pair of fixed, as integrally molded, trunnions 89 and 90 extending from each end thereof and presenting downwardly facing convex surfaces which rest on the upwardly facing concave surfaces of the respective hangers 81 and 82. Said convex trunnion surfaces are curved on a slightly smaller radius than that of the concave hanger surfaces 83 and 84, as best shown in FIG. 12, in order to assure easy pivoting with respect thereto and avoidance of binding.

Figure 14:
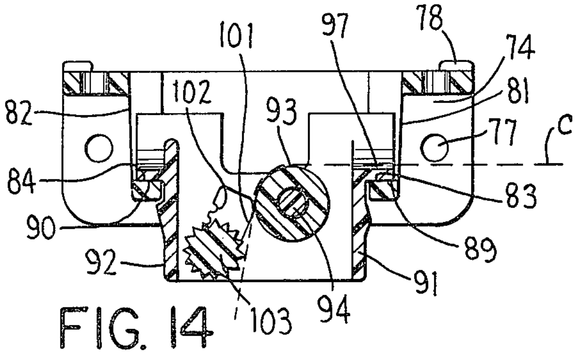
FIG. 14 is a section shown on the line XIV—XIV of FIG. 12 but eliminating therefrom the showing of the supporting structure.

Roller and lock structure is provided here generally similar to that of FIGS. 1–5. In this instance, a roller 93 is mounted on an axle 94 which is fixed rigidly between and with respect to said sides 87 and 88. Same may be so fixed in any convenient manner as by upsetting as indicated at 96 (FIG. 15). As best shown in FIG. 14 the upper surface of said roller is aligned with or slightly above the upper surface 97 of one of the trunnions in order that a cord C guided thereby may lead out therefrom to the structure it is controlling.

Lock structure is also provided for said cord C which is the same as that above described in connection with FIGS. 1–5. Since same is identical to the structure already described in connection with FIGS. 1–5, a further detailed description is unnecessary and it is sufficient only to identify the parts thereof, namely the slot 101 having teeth 102 along one side thereof, the cord engaging knurled roller 103 and a small pinion 104 (FIG. 11) integral therewith for engaging the rack teeth 102. Thus, rotation of the knurled roller 103 by contact with a moving cord C will cause said pinion 104 to walk along the rack teeth 102 and assure movement of said lock in a proper direction for fixing or releasing same as desired and as determined by the direction of movement of said cord C.

In the form here shown, the stiffener 106 is of such thickness that it is not possible (see FIG. 15) for the pulley guide 172 to assume a position parallel with the base plate 73 and the design and use of the structure in question is such that such a positioning would seldom if ever be necessary. However, if even greater versatility is desired for this unit, said stiffener 106 may be made of slightly less thickness in the vertical direction as appearing in FIG. 15 and with such modification the pulley guide 72 can assume a position parallel with that of the base plate 73.

Figure 16:
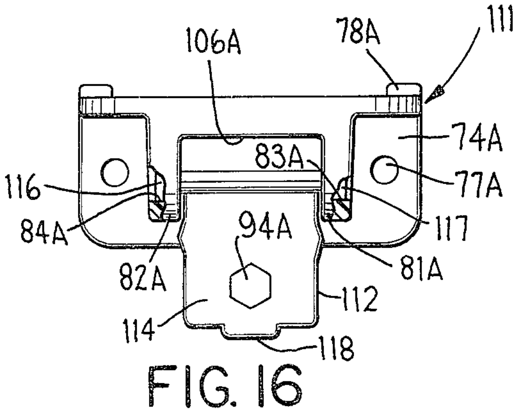
FIG. 16 is a side elevational, partially broken, view of a still further modified structure.
Figure 17:
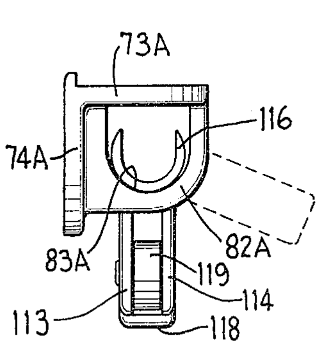
FIG. 17 is an end elevational view of the structure of FIG. 16 showing in broken lines therein the capacity of the pulley housing for swinging with respect to the hanger section.

In FIGS. 16 and 17 is shown a unit corresponding to that of FIGS. 7–9 and used, for example, intermediate the ends of a Roman shade. If desired, the hanger portion 111 thereof may be identical with the hanger 71 or as shown in the drawing and as will be more common in actual use, same may be slightly shorter to accommodate a pulley housing 112 which is somewhat shorter than the pulley housing 72.

The hanger 111 is, however, excepting for its length, identical with the hanger 71 and hence needs no detailed description. The numerals used thereon are the same as the numerals of the hanger 71 with the letter "A" associated therewith.

Turning now to the pulley housing 112, same comprises a generally rectangular box including a pair of spaced parallel sides 113 and 114 having fixed, as integrally molded, trunnions 116 and 117 at the upper end, same presenting a pair of downwardly facing convex trunnion surfaces for engagement with and support by the upwardly facing concave surfaces 83A and 84A of hangers 81A and 82A. A brace member 118 is provided across the bottom thereof. A pulley 119 is rotatably mounted between said side members 113 and 114 in any convenient manner, such as by a pin 94A which is identical with and upset in the same manner (FIGS. 14 and 15) as the pin 94.

Again, here, the stiffener 106A is of sufficient thickness that the pulley housing 112 is not able to quite assume a position parallel with the base plate 73A inasmuch as such positioning is seldom needed in the ordinary use of this pulley unit. However, if it is desired to have the greater versatility of such positioning, then it is a simple matter to reduce the vertical (as seen in FIG. 16) dimension of the stiffener 106A and the pulley housing 112 will then have no difficulty in assuming a position parallel with the base plate 74A alternatively with its position parallel with the base plate 74A.

In the drawings and foregoing description, it will be noted that the cord guide means has throughout been referred to as usually a pulley, namely such as the pulleys 22, 65, 93 and 119. However, it will be recognized that such use of a pulley within the cord guide housing in each case is merely the preferable form of cord guide means for most instances and such cord guide means may instead of a pulley be a rigid guide without departure from the substance of the invention as appearing in any of the illustrated embodiments. Likewise the lock structure shown in connection with FIGS. 1–5 and 11–15, while effective and capable of good cooperation with the rest of the disclosed devices, is not critical in any specific form to the invention as set forth in any of several embodiments and same may be modified or omitted entirely excepting as hereinafter otherwise specifically claimed, without departure from the scope of the invention.

Although particular preferred embodiments of the invention have been disclosed in detail for illustrative purposes, it will be recognized that further variations or modifications of the disclosed apparatus, including the rearrangement of parts, lie within the scope of the present invention.

The embodiments of the invention in which an exclusive property or privilege is claimed are defined as follows:

1. In a cord guide support for a liftable shade, said cord guide support having a mounting surface and being articulated about a first axis parallel with said mounting surface, the combination comprising:

hanger means having a housing receiving opening therein and including means projecting into said opening from opposite sides thereof defining a pair of arcuate upwardly facing first surfaces;

cord guide housing means defining a cord guide surface and having a first opening for introducing a cord to said cord guide surface and a second opening for leading a cord out of said housing means away from said cord guide surface and means projecting from opposite ends of said cord guide housing means defining a pair of arcuate downwardly facing second surfaces, said second surfaces having at least substantially the same radius of curvature as, and being engageable with, said first surfaces;

said housing means being movable through said housing receiving opening whereby said second surfaces will engage and be supported upon said first surfaces for pivotal movement of said housing means relative to said hanger means about said first axis.

2. The device of claim 1 wherein said cord guide means is a rotatable pulley.

3. The device of claim 1 wherein said first surfaces are convex and said second surfaces are concave.

4. The device of claim 1 wherein said first surfaces are concave and said second surfaces are convex.

5. The device of claim 1 wherein said hanger means includes means enabling it to be fastened directly to a supporting surface.

6. The device of claim 1 wherein said housing receiving opening is rectangular and of greater length along the pivotal axis of said first surfaces than is its transverse dimension and wherein said second surfaces are provided by hemicylindrical members fixed to the housing means, said hemicylindrical members having lengths and diameters enabling them to fit closely but slidably into said housing receiving opening.

7. The device of claim 1 wherein said second surfaces comprise a pair of hemicylindrical flanges projecting coaxially in opposite directions from opposite ends of said housing means.

8. The device of claim 1 including also a cord-jamb mechanism incorporated into said housing means.

9. The device of claim 8 wherein said jamb mechanism comprises a pair of slots in register with each other on opposite sides of said hanger means;

a pin extending through both of said slots;

teeth on the edges of said slots away from said card guide surface and a knurled surface on said pin engageable with said teeth for positively effecting a jamming movement of said pin upon rotation thereof by a cord.

10. The device of claim 1 including also at least one cam means positioned on one of said hanger means and said housing means for providing limited obstruction to the entry of said housing means into said housing receiving opening, and to its removal therefrom, whereby said housing means may be snapped into position and will tend to remain in such position until snapped past said obstruction for removal therefrom.

11. The device of claim 1 including also at least one cam projecting into the housing receiving opening of said housing means for providing a limited obstruction to the entry of said housing means into said receiving opening and its removal therefrom whereby said housing means may be snapped into position and will tend to remain in such position until snapped past said obstruction for removal therefrom.

12. The device of claim 10 wherein said cam means is on said housing means and effects interference with adjacent portions of said hanger means.

13. In a cord guide support for a liftable shade, said cord guide support having a mounting surface and being articulated about a first axis which is substantially parallel with said mounting surface, said cord guide support comprising:

a one-piece hanger having a housing-receiving opening therein, said hanger including means disposed adjacent the oppoiste sides of said opening and defining a pair of arcuate upwardly facing first surfaces, said first surfaces being substantially aligned and formed generally about said first axis, said hanger also having said mounting surface formed thereon;

a one-piece cord-guide housing positionable within said housing-receiving opening, said cord-guide housing having defined thereon a pair of arcuate downwardly-facing second surfaces which are substantially aligned, said second surfaces having approximately the same radius of curvature as, and being engageable with, said first surfaces so that said cord-guide housing is pivotally supported on said hanger for angular displacement relative thereto about said first axis;

a cord-guide member mounted on said housing, said cord-guide member having an exterior cord-guide surface of a generally arcuate configuration, said cord-guide surface being generated approximately about a second axis which is substantially perpendicular with respect to said first axis;

said housing having a first opening for introducing a cord to said cord-guide surface and a second opening for leading a cord out of said housing away from said cord-guide surface;

said housing being movable into said housing-receiving opening for causing said second surfaces to engage and be slidably supported upon said first surfaces for pivotal movement of said housing relative to said hanger about said first axis.

14. A cord guide support according to claim 13, wherein said hanger and said housing have cooperating structure integrally formed and associated therewith for creating a resilient snap-fit between said housing and said hanger to maintain same in an assembled position.

15. A cord guide support according to claim 13 or claim 14, wherein each of said housing and said hanger is formed of a plastics material.

16. A cord guide support according to any one of claims 13–15, wherein the second opening as formed in said housing is approximately aligned with said first axis so that the cord which passes through said second opening is approximately aligned with said first axis.

17. A cord guide support according to claim 13, wherein said second opening as formed in said housing is substantially aligned with said first axis so that the cord when passing through said second opening is substantially aligned with said first axis, said second axis being spaced downwardly from said first axis so as to be in a nonintersecting relationship therewith, and each of said first and second surfaces being defined by a substantially semi-cylindrical shell as integrally formed on the respective hanger and housing.

* * * * *

UNITED STATES PATENT OFFICE
CERTIFICATE OF CORRECTION

Patent No. 4 250 597 Dated February 17, 1981

Inventor(s) James A. Ford

It is certified that error appears in the above-identified patent and that said Letters Patent are hereby corrected as shown below:

Column 3, line 53; change "There" to ---These---.

Column 7, line 30; change "74A" to ---73A---.

Column 8, line 42; change "card" to ---cord---.

Column 9; line 5; change "oppoiste" to ---opposite---.

Signed and Sealed this

*Ninth* Day of *June 1981*

[SEAL]

*Attest:*

RENE D. TEGTMEYER

*Attesting Officer* *Acting Commissioner of Patents and Trademarks*